United States Patent
Mica et al.

(10) Patent No.: US 11,203,228 B2
(45) Date of Patent: Dec. 21, 2021

(54) LUG NUT HOLDER AND METHOD OF USE

(71) Applicant: RoboTire, Inc., Canton, MI (US)

(72) Inventors: Eric Mica, Mountain View, CA (US); Victor Darolfi, Canton, MI (US)

(73) Assignee: RoboTire, Inc., Canton, MI (US)

( * ) Notice: Subject to any disclaimer, the term of this patent is extended or adjusted under 35 U.S.C. 154(b) by 0 days.

(21) Appl. No.: 17/192,976

(22) Filed: Mar. 5, 2021

(65) Prior Publication Data
US 2021/0283948 A1  Sep. 16, 2021

Related U.S. Application Data

(60) Provisional application No. 62/989,807, filed on Mar. 15, 2020.

(51) Int. Cl.
*B60B 7/06* (2006.01)
*F16B 37/04* (2006.01)
(Continued)

(52) U.S. Cl.
CPC ............ *B60B 7/068* (2013.01); *B23P 19/002* (2013.01); *F16B 37/041* (2013.01); *F16B 37/14* (2013.01)

(58) Field of Classification Search
CPC ........ F16B 37/14; F16B 37/041; F16B 37/04; B23P 19/001; B23P 19/002; B23P 19/06;
(Continued)

(56) References Cited

U.S. PATENT DOCUMENTS 3,481,641 A * 12/1969 Berger ............... H05K 13/0007
    294/100
6,134,989 A  10/2000 Stevens
(Continued)

FOREIGN PATENT DOCUMENTS

CN    110125860 A    8/2019
DE    19905489 C1    6/2000
(Continued)

OTHER PUBLICATIONS

International Search Report in PCT International Application No. PCT/US2021/020989, dated May 25, 2021.

*Primary Examiner* — Christopher M Koehler
(74) *Attorney, Agent, or Firm* — Cognition IP, P.C.; Edward Steakley

(57) ABSTRACT

An apparatus and method for holding a lug nut. The apparatus includes a base (150), a barrel (140), a lug nut engagement assembly (130), a plunger and a cam guide (170). The barrel (140) is coupled with the base (152) in a manner allowing the barrel (140) to move upwardly or downwardly within the base (150). The barrel (140) has an internal cam track portion (145). The lug nut engagement assembly (130) includes retractable fingers (132). The lug nut engagement assembly (130) is removeably affixed to the barrel (140). The plunger (160) is disposed within a portion of the lug nut engagement assembly (130), the barrel (140) and the cam guide (170). The plunger (160) has a tip for engagement with the retractable fingers (132). The cam guide (170) is disposed and moveable within a bottom portion of the barrel (140). The cam guide (170) has longitudinal rails (172) for engagement with the internal cam track (145) of the barrel (140).

14 Claims, 15 Drawing Sheets

(51) Int. Cl.
 *F16B 37/14* (2006.01)
 *B23P 19/00* (2006.01)
(58) Field of Classification Search
 CPC ........... B60B 7/068; B25B 5/08; B25B 5/166;
  B25B 11/02; B25B 1/08
 USPC .................................................. 269/48.1, 47
 See application file for complete search history.

(56) References Cited

U.S. PATENT DOCUMENTS

| | | |
|---|---|---|
| 6,170,895 B1 | 1/2001 | Schopp |
| 8,086,340 B2 | 12/2011 | Kondo et al. |
| 8,776,345 B2 | 7/2014 | Komatsu et al. |
| 9,168,621 B2 * | 10/2015 | McIntosh ................. B25B 5/087 |
| 9,248,701 B2 | 2/2016 | Calvi |
| 9,610,660 B2 | 4/2017 | Komatsu et al. |
| 9,700,973 B2 | 7/2017 | Komatsu et al. |
| 9,700,974 B2 | 7/2017 | Komatsu et al. |
| 9,757,827 B2 | 9/2017 | Komatsu et al. |
| 9,757,828 B2 | 9/2017 | Komatsu et al. |
| 10,493,799 B2 | 12/2019 | Hedley et al. |
| 2006/0288577 A1 | 12/2006 | Bormuth |
| 2009/0035107 A1 | 2/2009 | Duran et al. |
| 2009/0308210 A1 | 12/2009 | Elgin |
| 2013/0152743 A1 | 6/2013 | Depue |
| 2019/0389258 A1 | 12/2019 | Wen |
| 2020/0001414 A1 | 1/2020 | Wen |

FOREIGN PATENT DOCUMENTS

| | | |
|---|---|---|
| WO | 2009/122025 A1 | 10/2009 |
| WO | 2019/210390 A1 | 11/2019 |

\* cited by examiner

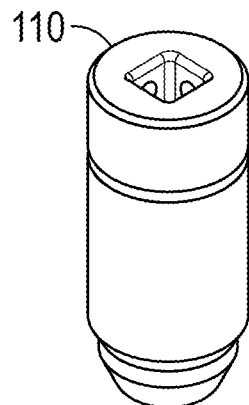
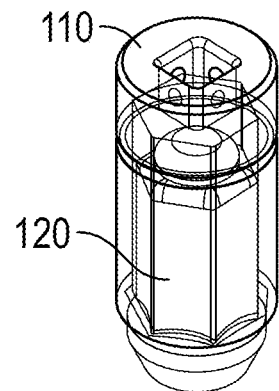
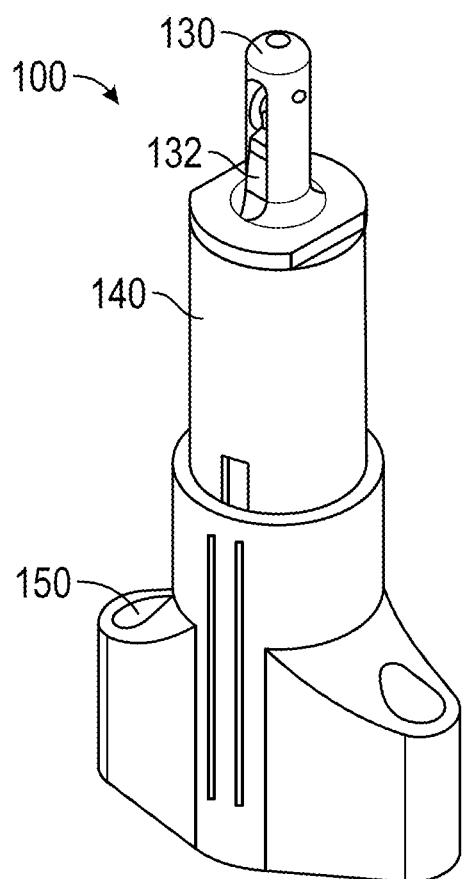
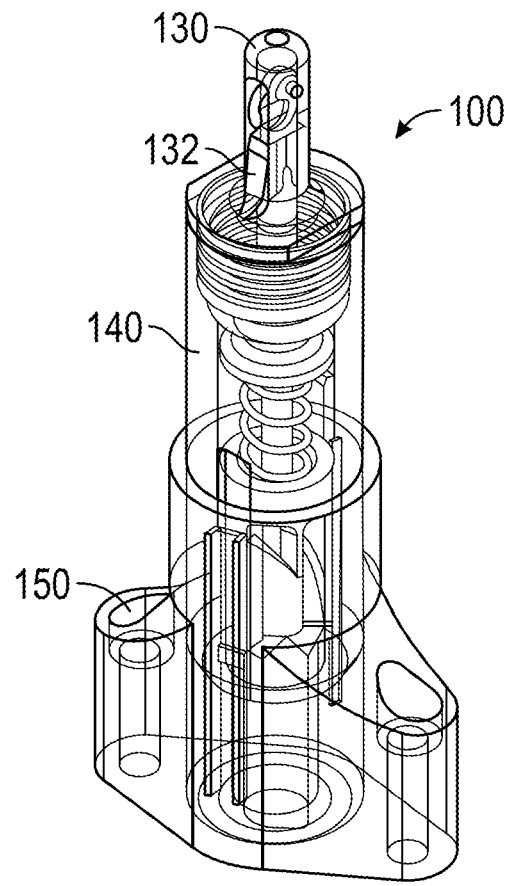
FIG. 1A                FIG. 1B

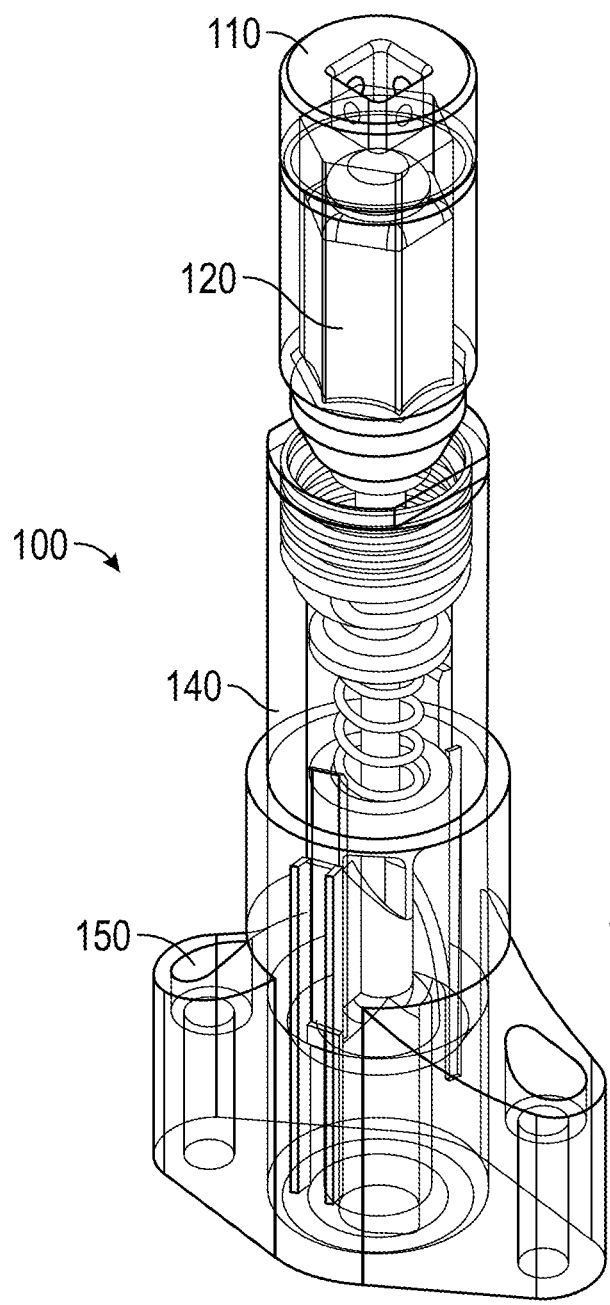
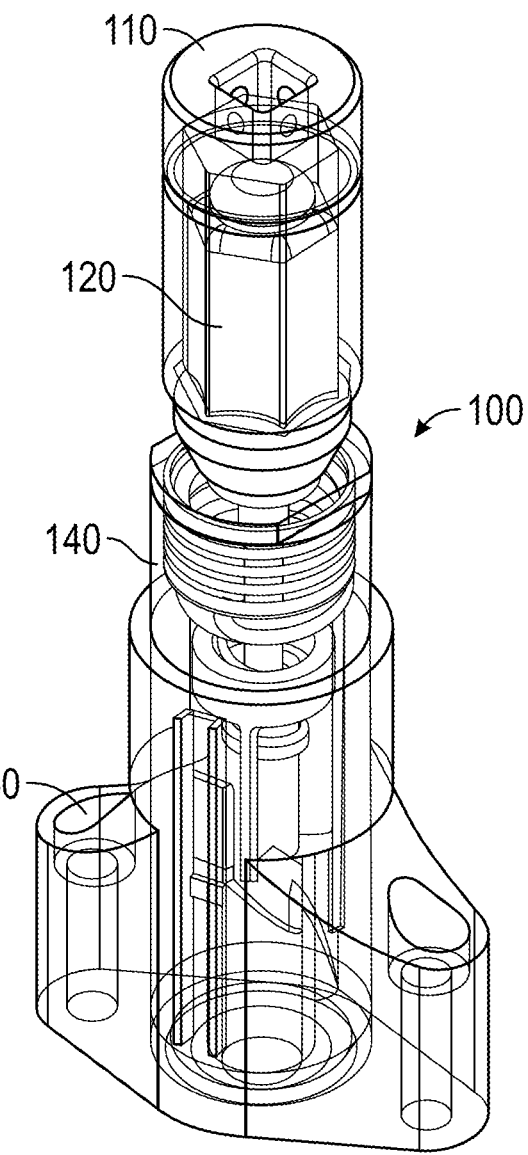
FIG. 2A
FIG. 2B

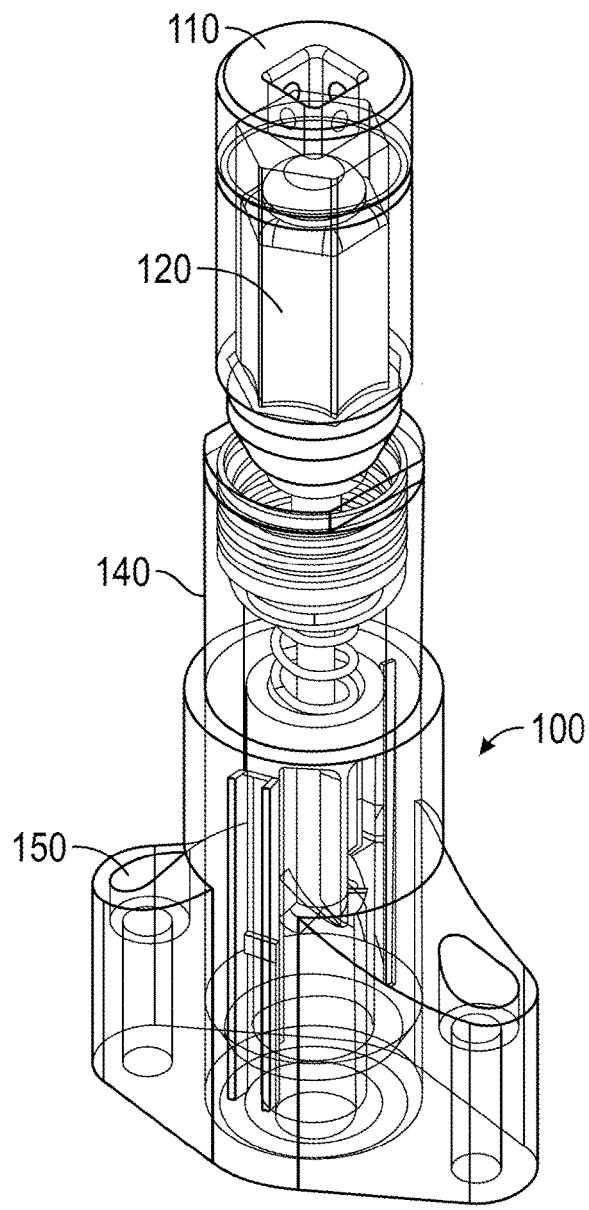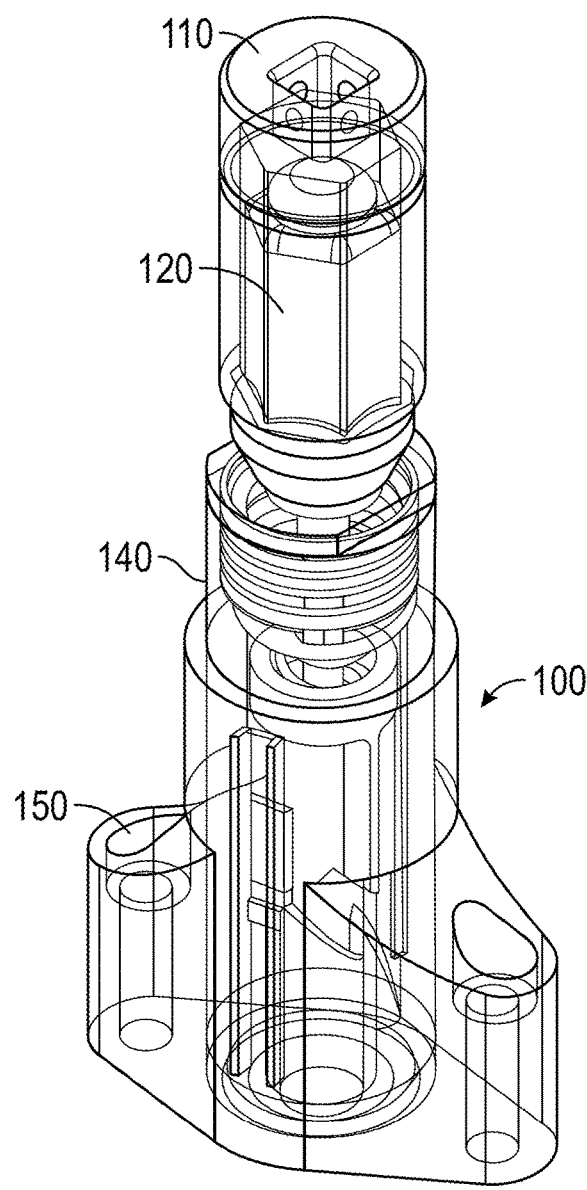
FIG. 5A                    FIG. 5B

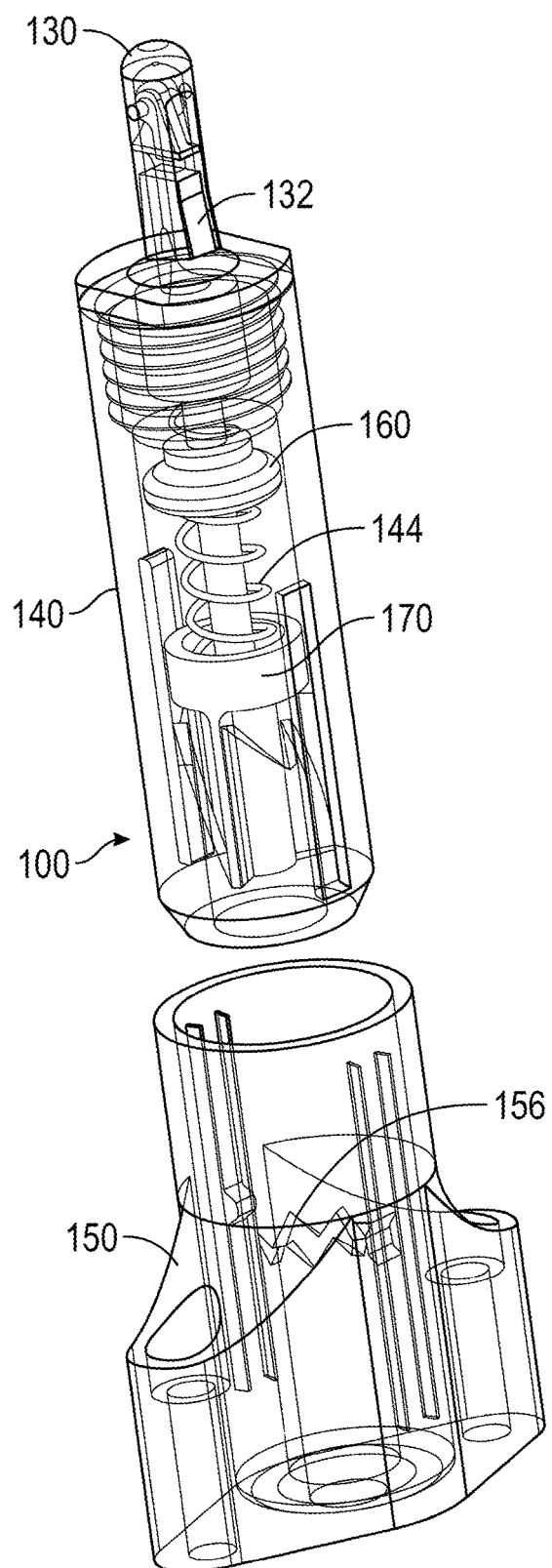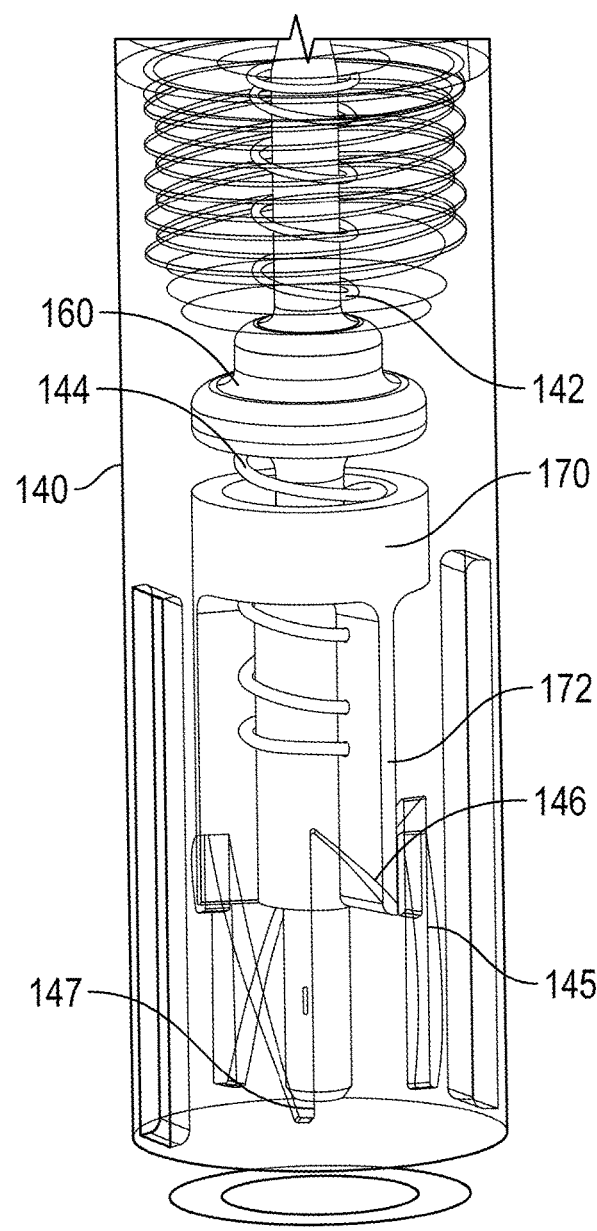
FIG. 10A
FIG. 10B

1300

```
┌─────────────────────────────────────────────────┐
│ OBTAINING A LUG NUT USING A LUG NUT SOCKET, THE │
│ SOCKET HAVING A MAGNETIC PORTION FOR HOLDING THE│─1310
│                    LUG NUT.                     │
└─────────────────────────────────────────────────┘
                         ↓
┌─────────────────────────────────────────────────┐
│ PLACING AN OPEN END OF THE LUG NUT ONTO A LUG NUT│
│ HOLDER WHILE THE LUG NUT REMAINS IN THE SOCKET. │─1320
└─────────────────────────────────────────────────┘
                         ↓
┌─────────────────────────────────────────────────┐
│ APPLYING A DOWNWARD FORCE WITH THE LUG NUT ON THE│
│ LUG NUT HOLDER CAUSING LUG NUT HOLDER ENGAGEMENT │
│ FINGERS TO EXTEND AND ENGAGE AN INTERNAL THREADED│─1330
│            PORTION OF THE LUG NUT.               │
└─────────────────────────────────────────────────┘
                         ↓
┌─────────────────────────────────────────────────┐
│ REMOVING THE SOCKET FROM THE LUG NUT WHILE THE LUG│
│ NUT REMAINS ENGAGED IN A FIXED POSITION WITH THE │─1340
│                 LUG NUT HOLDER.                  │
└─────────────────────────────────────────────────┘
                         ↓
┌─────────────────────────────────────────────────┐
│          PLACING THE SOCKET ONTO THE LUG NUT.    │─1350
└─────────────────────────────────────────────────┘
                         ↓
┌─────────────────────────────────────────────────┐
│ APPLYING A DOWNWARD FORCE WITH THE LUG NUT ONTO  │
│ THE LUG NUT HOLDER CAUSING THE ENGAGEMENT FINGERS│
│ TO RETRACT AND DISENGAGE FROM THE INTERNAL       │─1360
│        THREADED PORTION OF THE LUG NUT.          │
└─────────────────────────────────────────────────┘
```

FIG. 13

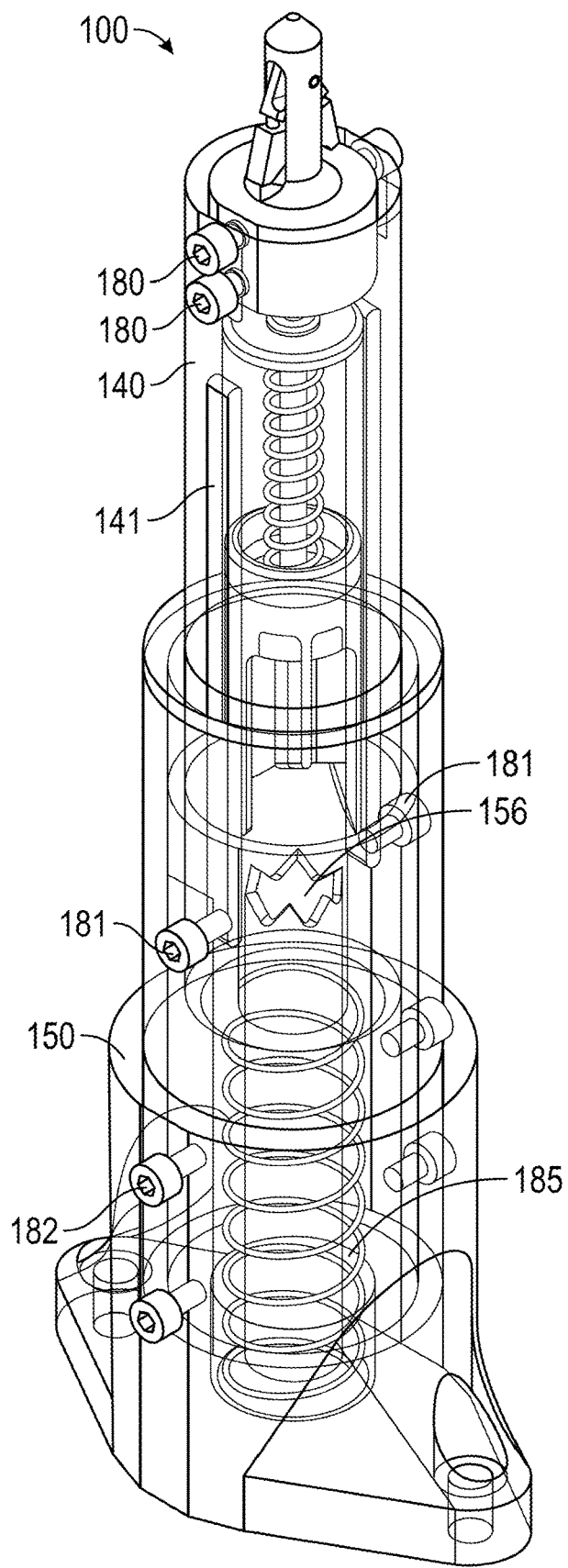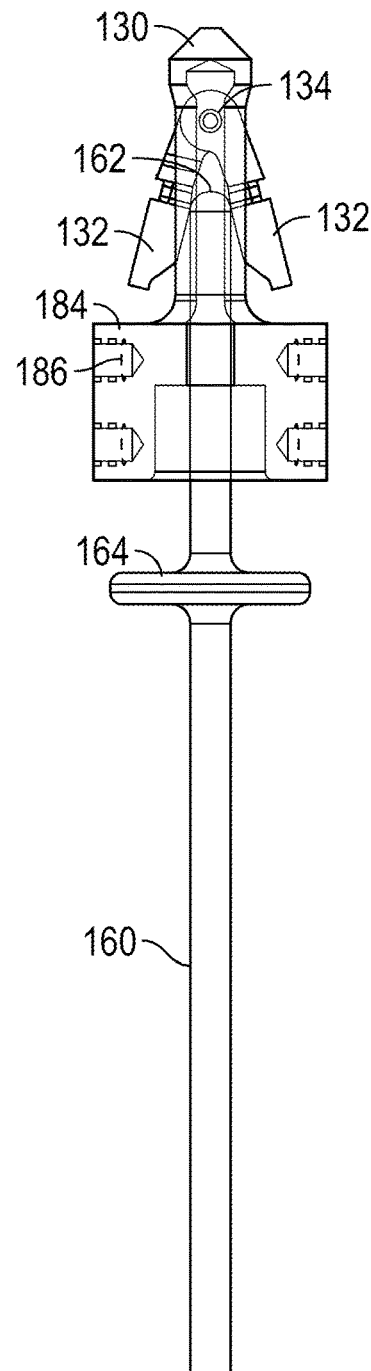
FIG. 14A
FIG. 14B

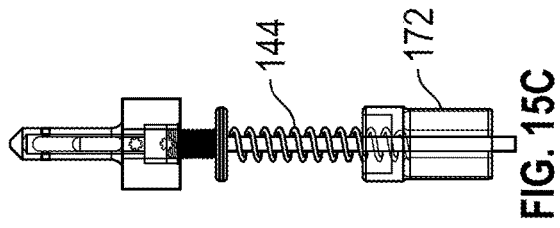
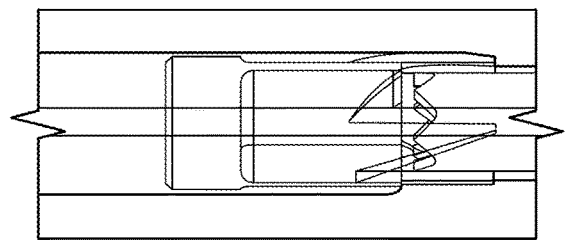
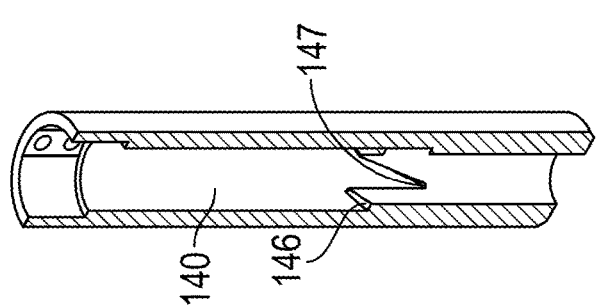
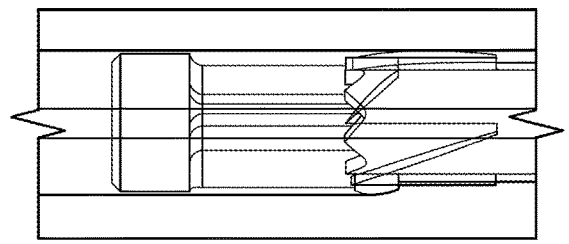
FIG. 15C
FIG. 15B
FIG. 15D
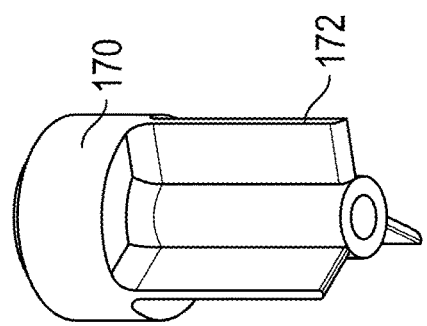
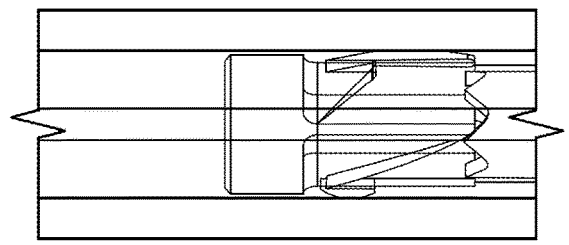
FIG. 15A

LUG NUT HOLDER AND METHOD OF USE

CROSS-REFERENCE TO RELATED APPLICATIONS

This application claims the benefit of U.S. Provisional Application No. 62/989,807, filed Mar. 15, 2020, which is hereby incorporated by reference in its entirety.

BACKGROUND

During the tire changing process lug nuts must be removed so that the wheels can be taken off of a vehicle. Once the wheels have been placed back on the vehicle, the lug nuts must be reinstalled. Both removal and reinstallation are performed by a tool, commonly referred to as nut runner, that has one or more sockets to loosen and tighten the lug nuts. Each socket must be equipped with a method of retaining the lug nut(s) during handling. This retention method is commonly a fixed magnet but the same effect could be achieved with a vacuum system, gripper, solenoid, or electromagnet. Each socket is only capable of handling one lug nut at a time, so there needs to be a method for storing lug nuts as the nut runner cycles through each wheel stud. The lug nest provides a location for lug nuts to be "dropped off" and stored during removal. The lug nuts can later be "picked up" from the lug nest during installation.

SUMMARY

Described herein is an exemplary apparatus for receiving and holding a lug nut from a lug nut socket, and later releasing the lug nut to the lug nut socket. The apparatus has a single socket with a fixed magnet to retain the lug nut. The single socket affords flexibility for handling different bolt patterns with different numbers of studs. The fixed magnet is a compact solution for lug nut handling. After each lug nut removal, the tool places the lug nut into the lug nest. The tool will pick up the lug nuts one at a time and place them back on the vehicle during reinstallation.

In one embodiment there is an apparatus for holding a lug nut. The apparatus includes a base, a cylindrical barrel, a lug nut engagement assembly, a plunger and a cam guide. The barrel is coupled with the base in a manner allowing the barrel to move upwardly or downwardly within the base. The barrel has an internal cam track portion. The lug nut engagement assembly includes retractable fingers. The lug nut engagement assembly is removeably affixed to the barrel. The plunger is disposed within a portion of the lug nut engagement assembly, the barrel and the cam guide. The plunger has a tip for engagement with the retractable fingers. The cam guide is disposed and moveable within a bottom portion of the barrel. The cam guide has longitudinal rails for engagement with the internal cam track of the barrel.

In another embodiment there is an apparatus with a lug nut nest including a base plate and multiple lug nut holders coupled to the base plate. The lug nut holder is of a configuration as described herein.

In another embodiment there is method for operation of a lug nut holder. A lug nut is obtained using a socket that has a magnetic portion for holding the lug nut. The open end of the lug nut is placed onto a lug nut holder while the lug nut remains in the socket. The lug nut holder has engagement fingers that are actuated when a downward force is applied to the lug nut holder. A downward force is applied with the lug nut onto the lug nut holder causing the engagement fingers to extend and engage an internal threaded portion of the lug nut. The socket is removed from the lug nut while the lug nut remains engaged in a fixed position with the lug nut holder.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 1A illustrates an example embodiment of the lug nut holder.

FIG. 1B illustrates an example embodiment of the lug nut holder.

FIG. 2A illustrates an example embodiment of the lug nut holder.

FIG. 2B illustrates an example embodiment of the lug nut holder.

FIG. 5A illustrates an example embodiment of the lug nut holder.

FIG. 5B illustrates an example embodiment of the lug nut holder.

FIGS. 10A-10B illustrate example embodiments of the lug nut holder.

FIG. 13 illustrates a flow chart illustrating a method of use of a lug nut holder.

FIGS. 14A-14B illustrate example embodiments of the lug nut holder.

FIGS. 15A-15D illustrate operations of the example lug nut holder.

DETAILED DESCRIPTION

Figure 3C:
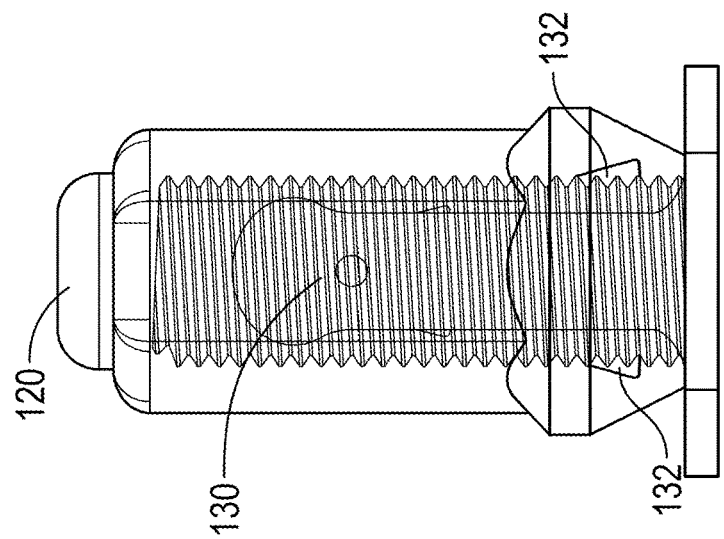
FIG. 3C illustrates an example embodiment of the lug nut holder.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims.

The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

A lug nut is obtained using a socket that has a magnetic portion for holding the lug nut. The open end of the lug nut is placed onto a lug nut holder while the lug nut remains in the socket. The lug nut holder has engagement fingers that are actuated when a downward force is applied to the lug nut holder. A downward force is applied with the lug nut onto the lug nut holder causing the engagement fingers to extend and engage an internal threaded portion of the lug nut.

The socket is removed from the lug nut while the lug nut remains engaged in a fixed position with the lug nut holder.

Components of the Lug Nut Holder may include:
100—Lug Nut Holder
110—Socket
120—Lug Nut
130—Lug Nut Engagement Assembly
131—Lug Nut Engagement Assembly Pin Hole
132—Retractable Finger
133—Lug Nut Engagement Assembly Threaded Portion
134—Pin
135—Lug Nut Engagement Assembly Finger Slot
136—Lug Nut Engagement Assembly Shelf
140—Cylindrical Barrel
141—Barrel Longitudinal Recess Portion
142—First Spring
143—Barrel Inner Threaded Portion
144—Second Spring
145—Cam Guide Track
146—Upper Track Position
147—Lower Track Position
150—Lug Nut Holder Base
152—Base Mounting Holes
155—Linear Parallel Cuts
156—Internal Teethed Ring
160—Plunger
162—Plunger Tip
164—Plunger Lip
170—Cam Guide
172—Cam Guide Longitudinal Rails
174—Cam Guide Top Portion Opening
176—Cam Guide Bottom Portion Opening
1200—Lug Nut Nest
1210—Lug Nut Nest Base FIGS. 1A and 1B illustrate example embodiments of the lug nut holder. FIG. 1B is a transparent or see-through view of the solid view of FIG. 1A. The lug nut holder (100) includes a base (150), a barrel (140), and lug nut engagement assembly (130) with extendable/retractable fingers (132). A socket (110) with a magnetic portion is used to place a lug nut (120) onto the lug nut engagement assembly (130).

FIGS. 2A and 2B illustrate example embodiments of the lug nut holder 100. The illustration depicts the socket (110) containing a lug nut (120) being placed onto the lug nut engagement assembly. Downward force is applied to the socket which in turn applies downward force to the lug nut assembly causing the assembly to move downward from a first position as shown in FIG. 2A to a second position as shown in FIG. 2B. As will be described later, by moving the lug nut engagement assembly downward, this cause a plunger to contact internal surfaces of the fingers causing them to extend and engage with the threaded internal portion of the lug nut (120).

Figure 3B:
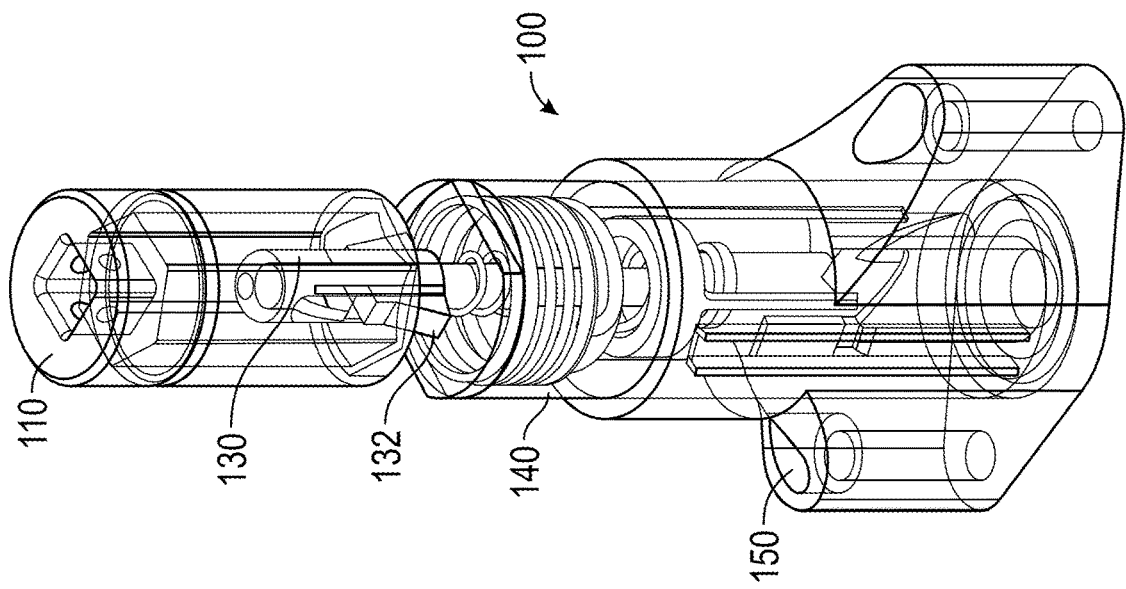
FIG. 3B illustrates an example embodiment of the lug nut holder.
Figure 3A:
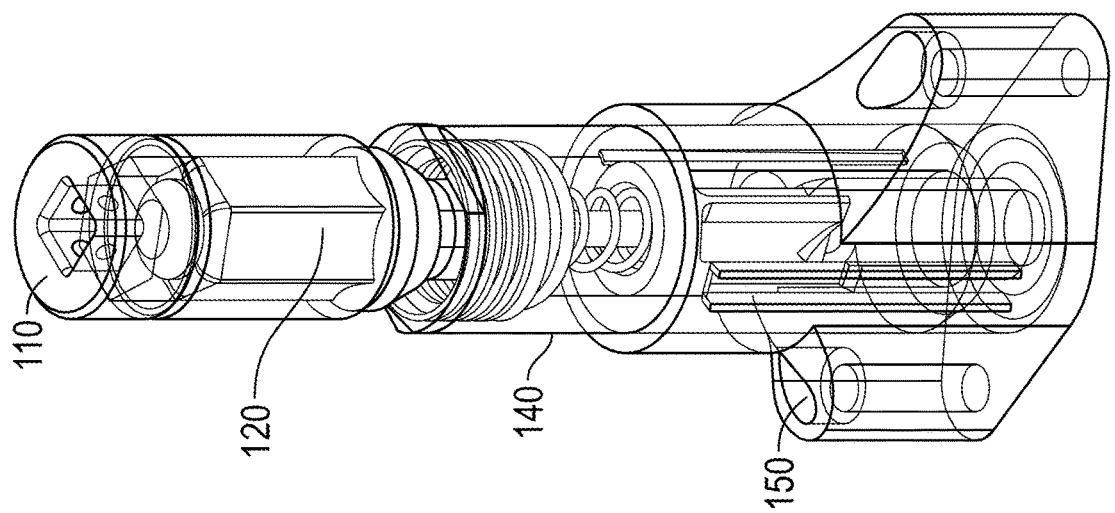
FIG. 3A illustrates an example embodiment of the lug nut holder.

FIGS. 3A, 3B and 3C further illustrate example embodiments of the lug nut holder 100. These figures further illustrate the fingers (132) of the lug nut engagement assembly (130) engaging with the internal threaded portion of the lug nut (120). As shown in the transparent view of FIG. 3C. the lug nut engagement assembly (130) is moved into the internal cavity of the lug nut (120). The fingers (132) are pushed outwardly by an internal plunger of the lug nut holder (100) which causes the fingers (132) to engage with the threads of the lug nut (120).

Figure 4:
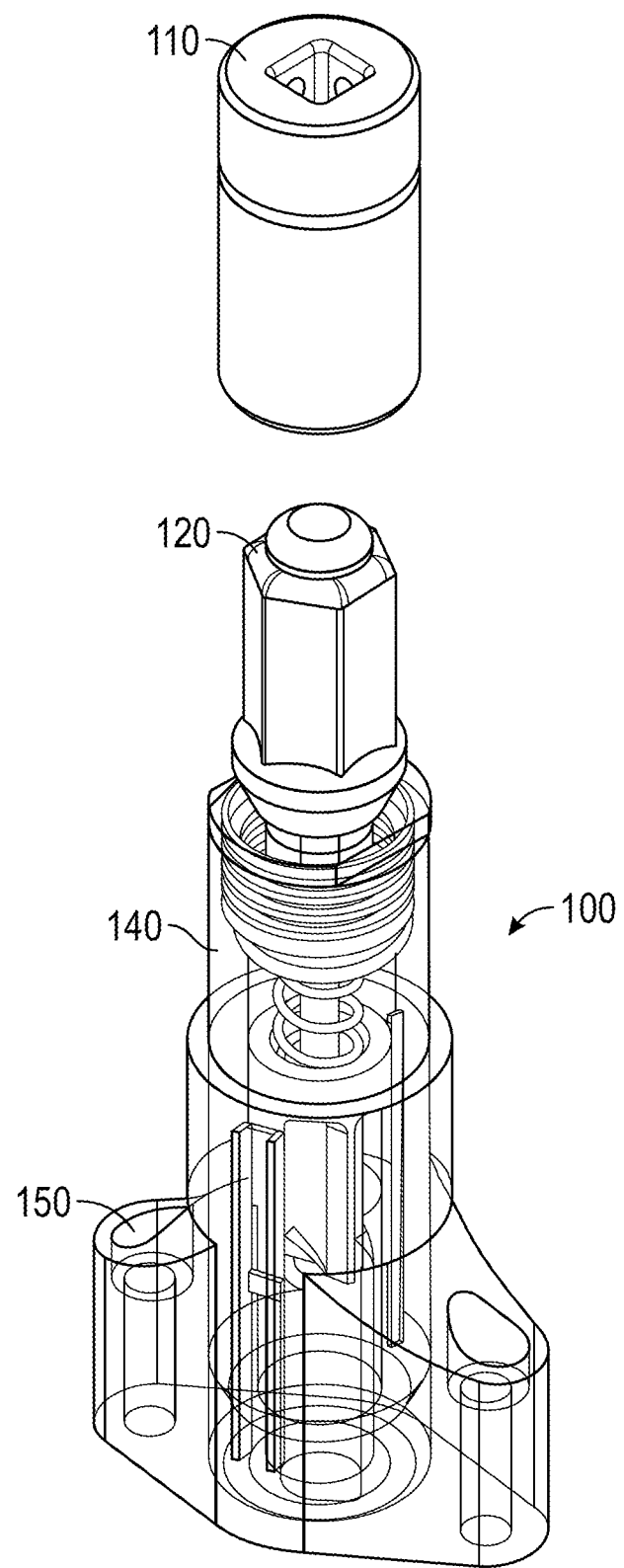
FIG. 4 illustrates an example embodiment of the lug nut holder.

FIG. 4 illustrates an example embodiment of the lug nut holder 100. After the fingers of the lug nut holder engage the lug nut (120), then the socket (110) may be pulled upward thereby detaching from the lug nut (120). As indicated previously, the socket (110) may have a magnetic portion that retains the lug nut (120) inside of the socket (110). However, once the fingers (132) engage the internal threads of the lug nut (120), the lug nut (120) is fixed such that the magnetic force of the socket (110) is overcome leaving the lug nut (120) affixed to the lug nut engagement assembly (130).

FIGS. 5A and 5B illustrate example embodiments of the lug nut holder (100). The lug nut (120) may later be retrieved from the lug nut (120) and placed back onto a vehicle. To retrieve the lug nut (120) from the lug nut holder (100), the socket (110) is placed over the lug nut that is stored in an engaged position on the lug nut engagement assembly (130). A downward force is applied to the socket (110) which in turn applies downward force to the lug nut. In turn, the lug nut engagement assembly (130) is pushed downward. This causes internal mechanisms, as will be discussed below, to allow internal plunger (160) to move downward. As the plunger (160) moves downward, the fingers (132) retract and disengage from the interior threaded portion of the lug nut (120).

Figure 6B:
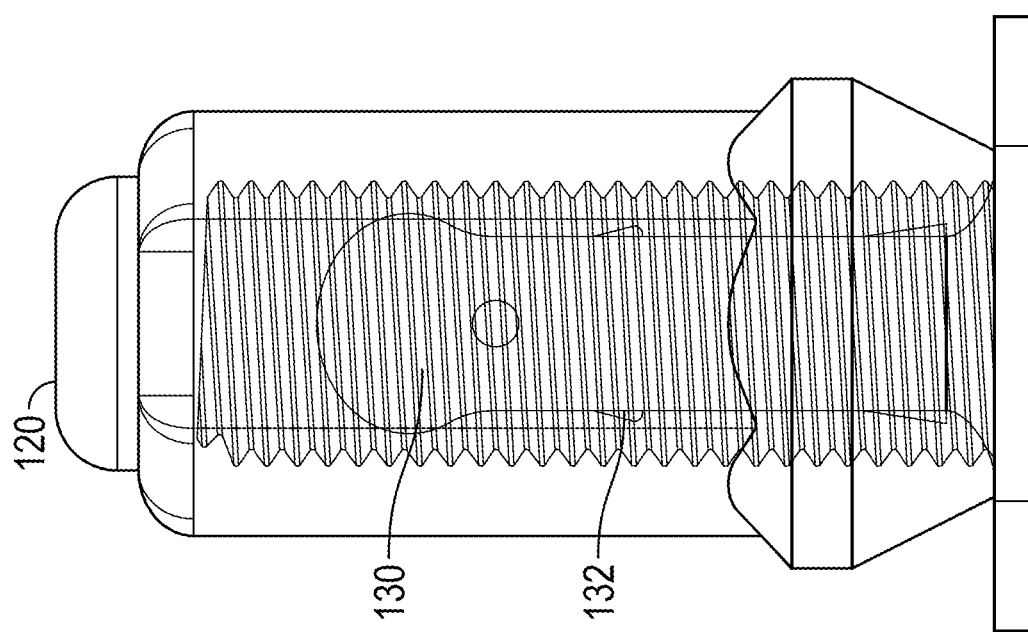
FIG. 6B illustrates an example embodiment of the lug nut holder.
Figure 6A:
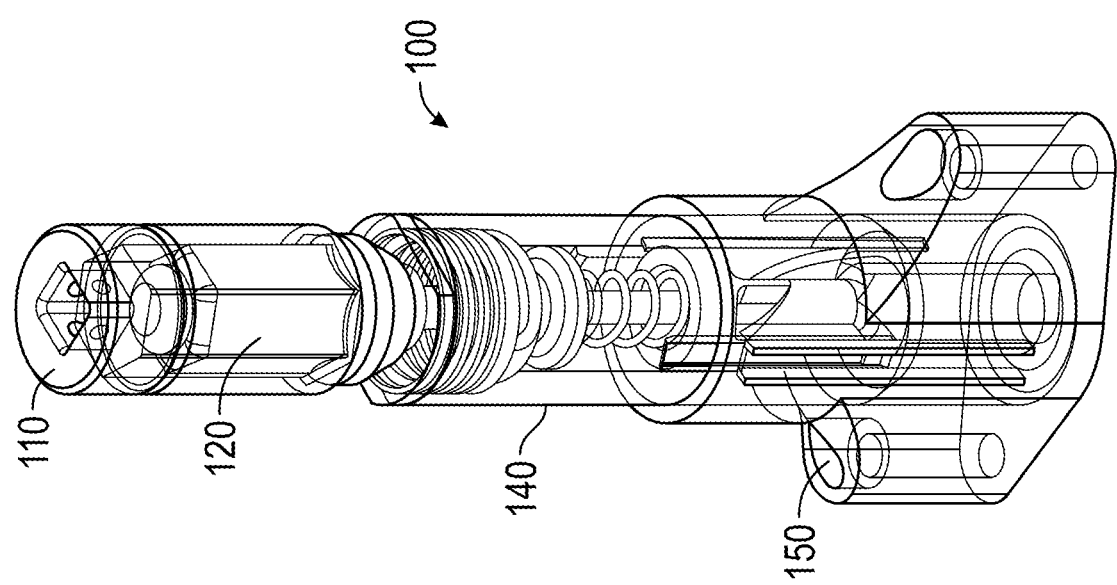
FIG. 6A illustrates an example embodiment of the lug nut holder.

FIGS. 6A and 6B illustrate example embodiments of the lug nut holder (100). As shown in these figures, the socket (110) with its magnetic force may now lift the lug nut (120) from the lug nut engagement assembly as the fingers (132) have retracted. In particular, FIG. 6 shows the fingers in a recessed or retracted position.

Figure 7:
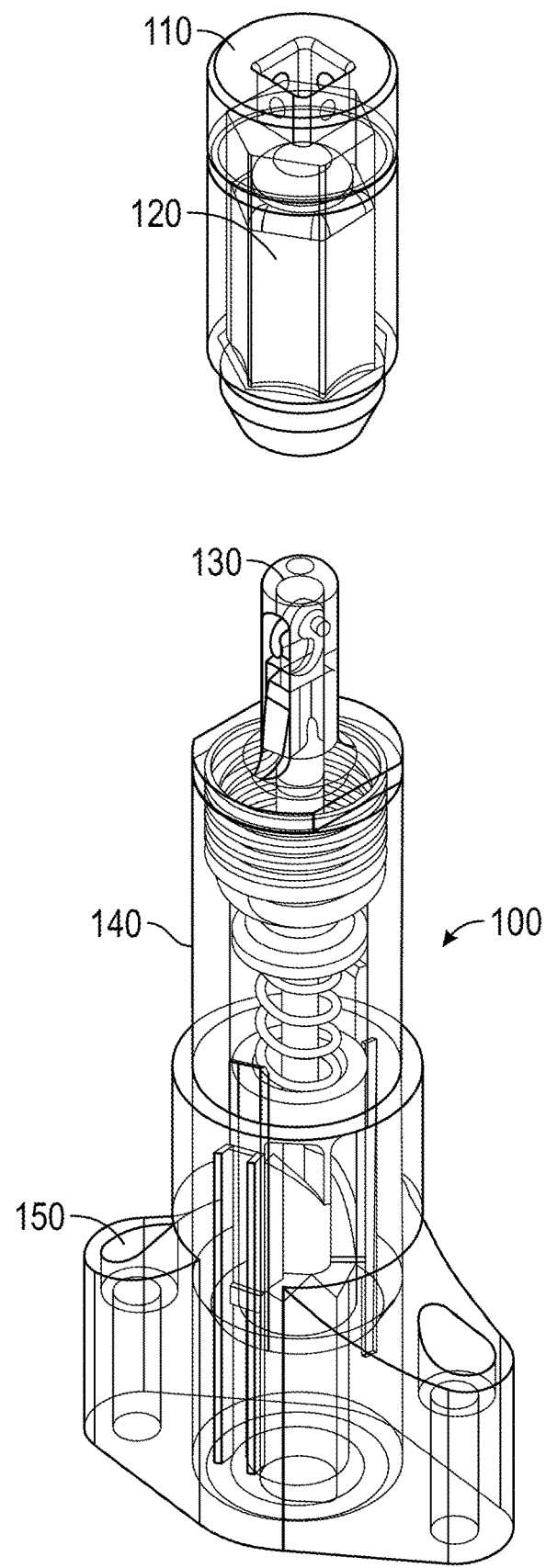
FIG. 7 illustrates an example embodiment of the lug nut holder.

FIG. 7 illustrates an example embodiment of the lug nut holder (100). As illustrated in this figure, the socket (110) has retrieved the lug nut (120) from the lug nut holder (100) using magnetic force to hold the lug nut (120) in the socket (110). The lug nut holder (100) after releasing the lug (120) is reset to a position to receive another lug (120).

Figure 8:
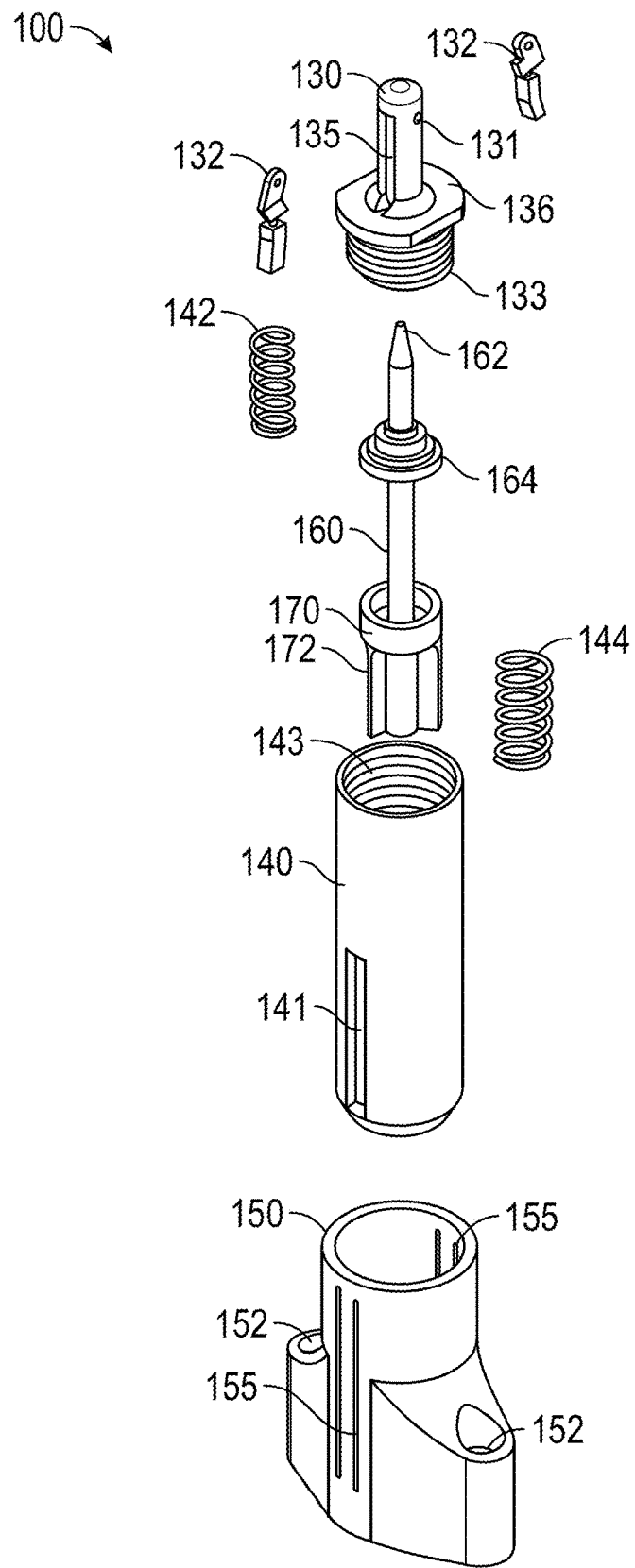
FIG. 8 illustrates an example embodiment of the lug nut holder.

FIG. 8 illustrates an example embodiment of the lug nut holder. Now discussion, will turn to the component parts of the lug nut holder (100). As discussed, the lug nut holder is comprised of five primary components: a base (150), a barrel (140), a cam guide (170), a plunger (160) and a lug nut engagement assembly. Each of these five primary components operate together to cause engagement and disengagement of lug nuts.

The base (150) provides a frame or structure to receive the barrel (140). The base (150), as well as any of the other components, may be made of any suitable material, such a plastic, metal, etc. The base (150) may have mounting holes (152) disposed through portions of the base thereby allowing the base to be secured to a base or other structure.

The barrel (140) provides a cylindrical moveable structure that engages with the base (150) via a longitudinal recessed portion (141) of the barrel (140). The barrel (140) is coupled with the base (152) in a manner allowing the barrel (140) to move upwardly or downwardly within the base (150). While not shown in FIG. 8, a button, knob or other protrusion may extend from surfaces of the internal wall of the base (150). As shown in FIG. 8, the base (150) may have linear parallel cuts (155) through the walls of the base (150). The protrusion may be positioned or integrally created on the interior surface of the remaining wall. The protrusion aids or guides the upward/downward vertical movement of the barrel (140) while moving within the (base).

Various components operate within the barrel (140), such as the cam guide (170), the plunger (160) and the first and second springs (142), (144).

The barrel (140) has a threaded portion (143), and the lug nut engagement assembly (130) has a thread portion (133). The threaded portions (143), (133) are configured for attaching the barrel (140) to the lug nut engagement assembly (130). The lug nut engagement assembly (130) acts as a cap to hold these various components in the barrel (140). The lug nut engagement assembly (130) has a threaded portion (133) that interlocks with the threaded portion (143) of the barrel (140).

In other words, the two components may be screwed together thereby housing the cam guide (170), the plunger (160) and the first and second springs (142), (144). Other locking mechanisms, such as a pin and groove connector and other connector types, may be used provided that the locking mechanism securely attaches the lug nut engagement assembly (130) with the barrel (140). In some embodiments, the lug nut engagement assembly (130) may be permanently fixed to the barrel (140), or removeably affixed to the barrel (140).

The lug nut engagement assembly (130) has a top portion with a hole (131) disposed therein for receiving a pin. Also, there is a slot (135) disposed within the top portion of the assembly (130). A pin positioned within the hole (131) for securing the retractable fingers (132) within the slot (135) and allowing the fingers (132) to move inwardly and outwardly in the slot (135).

The plunger (160) includes a rod with a lip portion (164) and a plunger tip (162), the plunger tip (162) is configured for engagement with the retractable fingers (132) of the lug nut engagement assembly (130). The retractable fingers (132) are hinged together via a pin in the lug nut engagement assembly (130). The plunger tip (162) may have a cone-shaped tip which engages with the retractable fingers (132). The retractable fingers (132) are pushed outwardly for engagement with a lug nut when the cone-shaped tip moves upward between the two fingers (132). The plunger (160) is disposed within a portion of the lug nut engagement assembly (130), within a portion of the barrel (140) and within a portion of the cam guide (170).

A first spring (142) is disposed around a first portion of the plunger (160) and above a lip portion (164) of the plunger (160). A second spring (144) is disposed around a second portion of the plunger (160) and below the lip portion (164) of the plunger (160).

The cam guide (170) includes one or more longitudinal rails (172). For example, the cam guide may include three longitudinal rails (172). An opening is longitudinally disposed internally throughout the cam guide (170). The opening configured for receiving the plunger (160).

FIGS. 9A-9D illustrate example embodiments of the lug nut holder. These figures help illustrate the operation of the lug nut holder (100). As discussed previously, the fingers (132) of the lug nut holder (100) grips the inside of the lug nut (120) when engaged. Engagement is determined by the position of the plunger (160).

The plunger has two operative positions a lowered plunger position and a raised plunger position. As depicted in the partial view of FIG. 9A, the plunger is in the lowered position. As shown, with the plunger (160) in the lowered position, the fingers (132) are allowed to retract and release a lug nut.

Figure 9A:
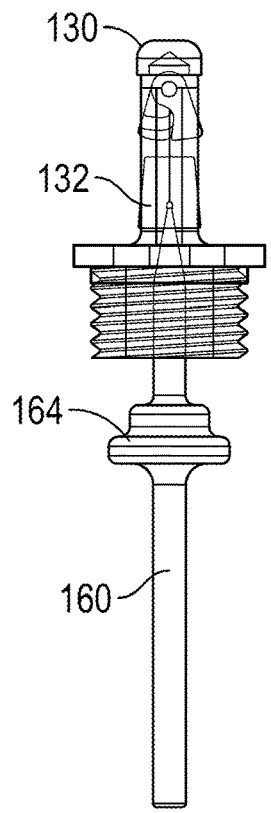
FIGS. 9A-9D illustrate example embodiments of the lug nut holder.
Figure 9B:
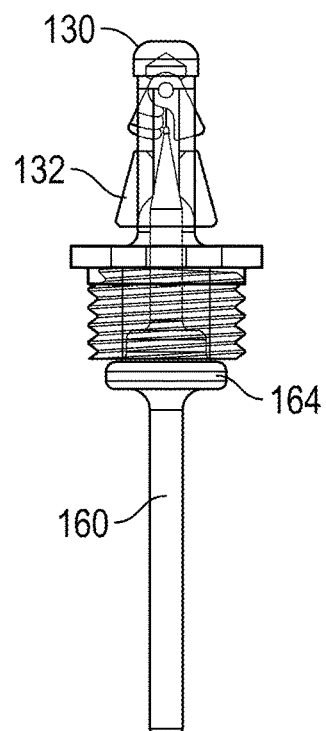

As depicted in the partial view of FIG. 9B, the plunger is in the raised position where the plunger (160) forces the two fingers (132) to swing outwardly and grip the lug nut. The fingers (132) form a wedge or arrow shape when set in the engaged position by the plunger (160). In one embodiment, the plunger (160) has a plunger lip or shelf (164) that contacts a bottom portion of the lug nut engagement assembly (130). The bottom portion provides a backstop for the plunger lip or shelf (164) to sit against such that the lip or shelf (164) inhibits additional upward movement of the plunger (164). In one embodiment, the plunger is cylindrically shaped.

Figure 9C:
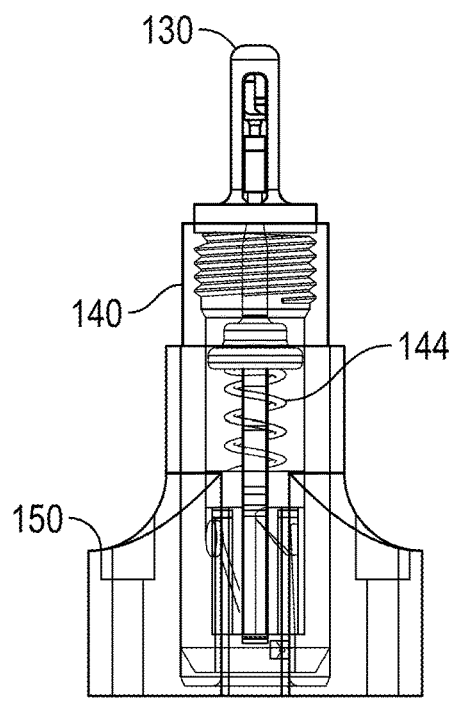
Figure 9D:
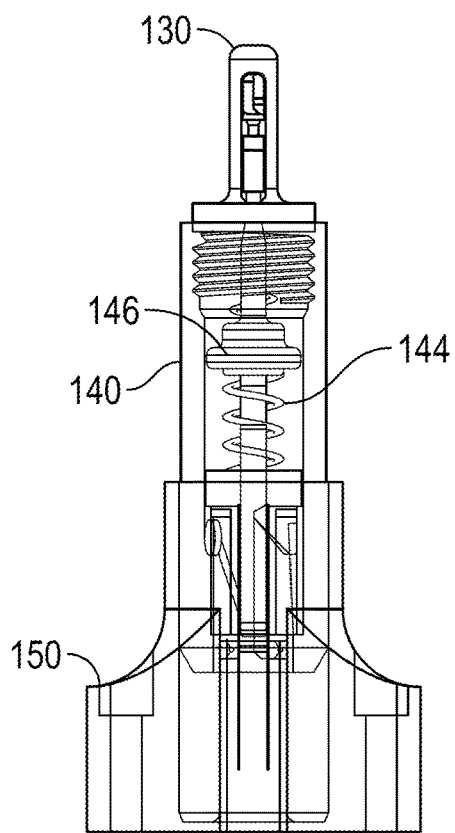

As illustrated by FIGS. 9C and 9D, the plunger (160) is actuated by pushing down on the lug nut holder (100) a fixed distance and then releasing. The mechanism is a mechanical, passive system, and therefore does not need a supply of power, air, vacuum, or signal to the lug nut holder.

FIGS. 10A and 10B illustrate example embodiments of the lug nut holder. FIG. 10B is zoomed partial view of FIG. 10A showing internal aspects of the barrel (140) and base (150). The lug nut holders (100) use an internal rotating mechanism, a cam guide (170), to change the position of the plunger (160). When the lug nut holder (100) is pushed down (compressed), teeth (156) in the base (150) grab longitudinal rails (172) (e.g., fins) of the cam guide (170) and push them out of their resting position against a preset stop inside of the barrel (140). When the lug nut holder (100) is released, spring force pushes the cam guide (170) into the next indexed preset of the barrel (140). The presets in the barrel (140) alternate between high (engaged) (146) and low (released) positions (147). This corresponds to the two operative plunger positions as discussed above.

The barrel (140) remains rotationally locked within the base (150) until downward pressure is applied to the lug nut holder (100). The relative clocking angle of the teeth (156) and the presets (146) (147) of the base (150) are configured such that the cam guide (170) is properly indexed for each actuation cycle.

When the lug nut engagement assembly (130) is pushed down, interaction by the cam guide (170) with the teeth (156) causes the cam guide (170) to rotate up and out of the previous barrel preset (146), (147). When the downward pressure is released, the internal springs push the cam guide (170) into the next barrel preset. This mechanism allows the cam guide (170) to rotate and alternate between high (146) and low positions (147) of the base (150) for each actuation cycle.

The compression spring (144) between the cam guide (170) and the plunger (160) allows the cam guide (170) to drive the plunger (160) to its two different positions. The bottom portion of the spring (144) may be seated within the internal body of the cam guide (170). The cam guide (170) may have an internal annular shelf that mates against the bottom of the spring (144). The top of the spring (144) may be seated against the bottom portion of the plunger lip (164) to drive the plunger (160) into different positions while the cam guide (170) moves along the internal cam track (145).

As the cam guide (170) moves to the next preset stop inside of the barrel (140) the cam guide (170) rotates in place. For example, the cam guide (170) may rotate 60 degrees per preset change. As the cam guide (170) rotates within the barrel, the cam guide also moves up and down within the barrel (140). The end portion of the longitudinal rails (172) of the cam guide (170) follow along the internal cam track (145) alternating between upper positions (146) and lower positions (147). For example, the internal cam track (145) may have three upper positions and three lower position presets (147) alternatively spaced 60 degrees apart.

The use of two springs (142), (144) allows for variance in the engaged or raised position of the plunger (160). The upper spring (142) is the return spring and provides the necessary force to drive the cam guide (170) down into the preset stops of the barrel (140). The second spring (144), between the cam guide (170) and the plunger (160), allows for varying lug nut sizes. The second spring (144) may have a significantly higher spring constant than the first spring (142). The second spring (144) creates a small amount of compliance in the plunger (160) position.

Figure 11A:
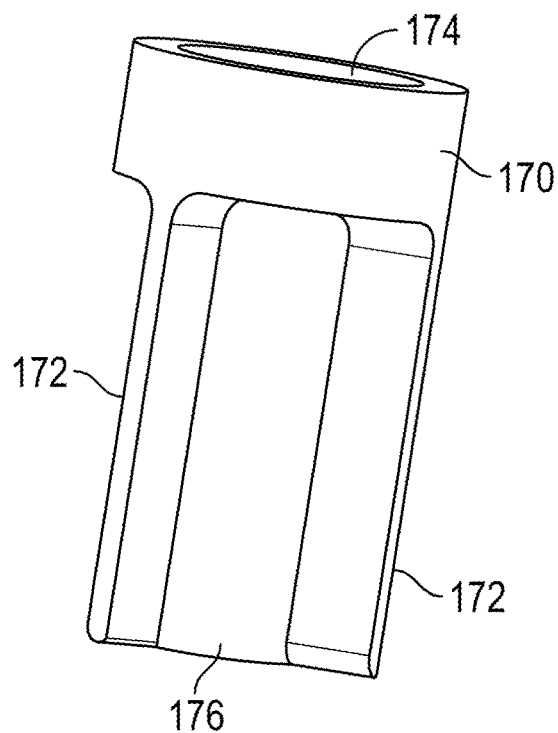
FIGS. 11A-11D illustrate example embodiments of the lug nut holder.
Figure 11B:
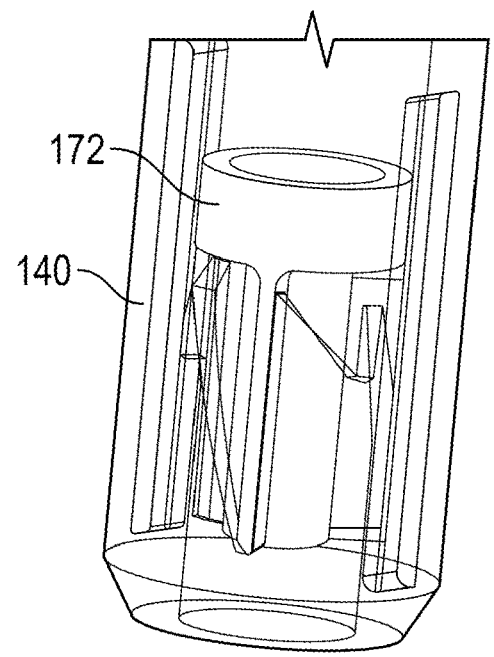
Figure 11C:
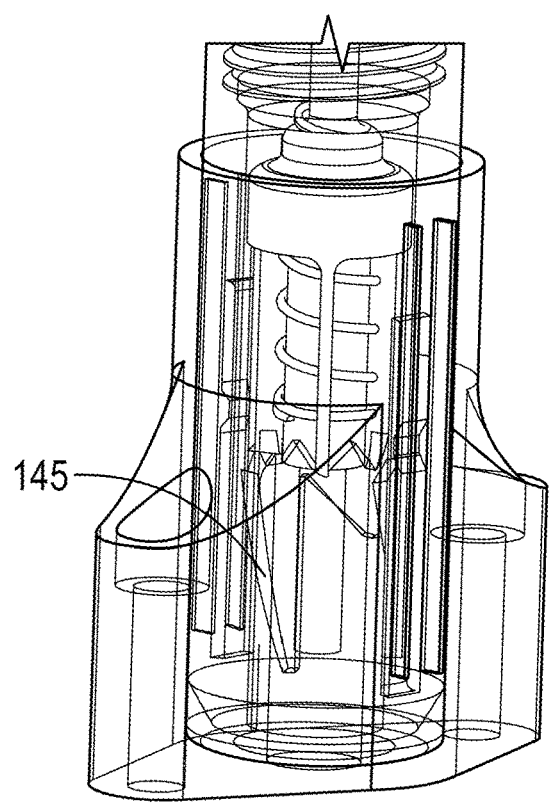
Figure 11D:
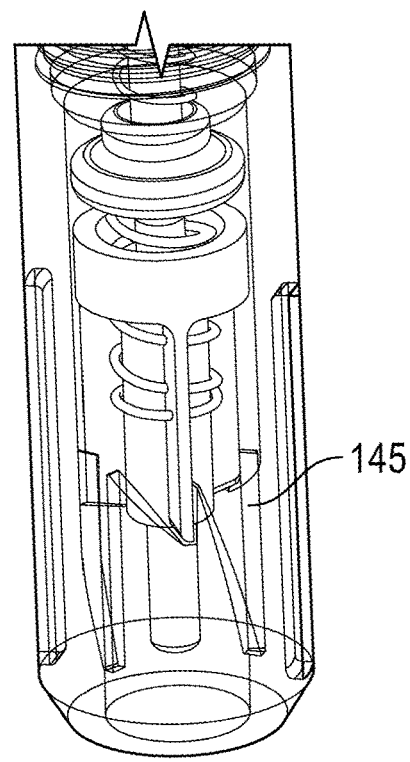

FIGS. 11A and 11B illustrate example embodiments of the lug nut holder. FIG. 11 depicts a cam guide (170) having multiple longitudinal rails for engagement with an internal cam track or portion (145) of the barrel (140). The cam guide (170) is positioned within the barrel (140) and rotatable within the barrel (140).

The barrel (140) has one or more external longitudinal barrel recessed portions (141), wherein the one or more external longitudinal barrel recessed portions (141) are configured to engage with protrusions of the interior of the base (150) along the linear parallel cuts (155). The internal cam track (145) has multiple alternating tracks with a first depth and a second depth. Depending on the position of the longitudinal rails (172) within the internal cam track (145), the lug nut engagement assembly (130) will either be engaged or disengaged. If the longitudinal rail (172) is positioned in an upper position of the internal cam track (145), then the fingers (132) would be extended in an engaged position. If the longitudinal rail (172) is positioned in a lower position of the internal cam track (145), then the fingers (132) would be retracted in a non-engaged position.

The internal cam track (145) has multiple edges disposed in parallel alignment with a vertical plane of the barrel (140), and multiple edges disposed in an angular alignment with the vertical plane of the barrel (140).

Figure 12:
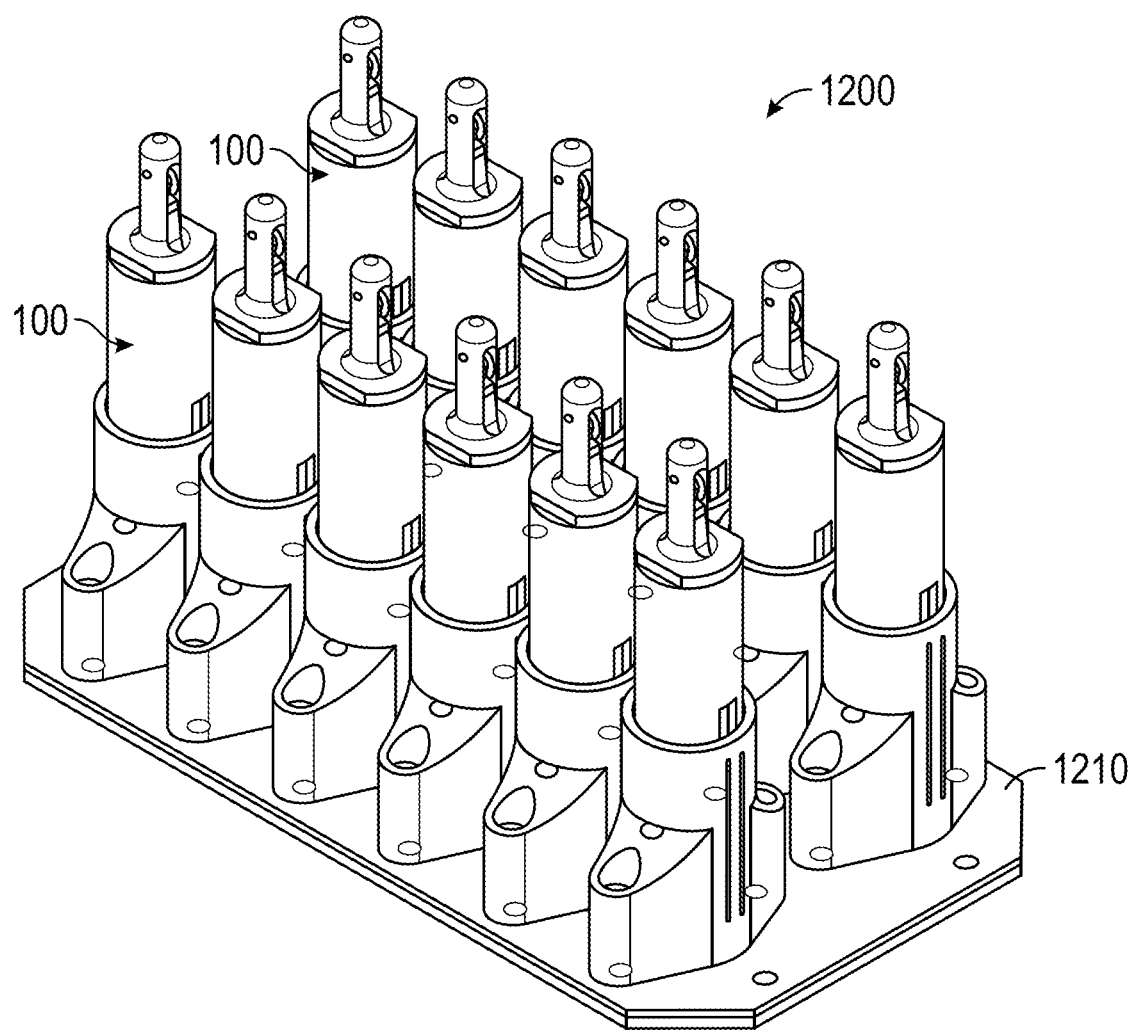
FIG. 12 illustrates an example embodiment of the lug nut nest with an array of lug nut holders.

FIG. 12 illustrates an example embodiment of a lug nut nest 1200. A lug nest 1200 may be configured with an array of lug nut holders 100. Each lug nut holder 100 can hold a single lug nut at a time. The number of lug nut holders 100 may depend on the required capacity of the lug nut nest. Most passenger vehicles will have four, five, or six lugs per wheel and there will be a nest for each side of the vehicle. A typical required holding capacity of a lug nut nest 1200 may be twelve lug nuts.

FIG. 13 illustrates a flow chart illustrating a method of use of a lug nut holder. A lug nut is obtained using a socket that has a magnetic portion for holding a lug nut in place (block 1310). An open end of the lug nut is placed onto a lug nut holder while the lug nut remains in the socket (block 1320). A downward force is applied with the lug nut onto the lug nut holder causing engagement fingers of the lug nut holder to extend and engage an internal threaded portion of the lug nut (block 1330). The socket is removed from the lug nut while the lug nut remains engaged in a fixed position with the lug nut holder (block 1340). The retrieve the lug nut, the socket is place onto the lug nut (block 1350). A downward force is applied with the lug nut onto the lug nut holder causing the engagement fingers to retract and disengage from the internal threaded portion of the lug nut (block 1360). The lug nut is then removed from the lug nut holder, and then may be applied or fasted onto a wheel hub bolt of a vehicle.

FIGS. 14A-14B illustrates another embodiment of the lug nut holder 100. The lug nut holder 100 operates similarly as described above. The lug nut holder 100 operates in two states: an engaged state where a lug nut is being held, and a disengaged state that allows the lug nut to be released. In the embodiment, the lug nut holder 100 uses fastening mechanism 180, 181, 182 (such as set screws) to secure components of the lug nut holder together. For example, the lug nut engagement assembly 130 may have a base portion 184 allowing the plunger 160 to move vertically within the base portion 184. The plunger tip 162 when moved upwardly interacts with the fingers 132 and causes the fingers 132 to pivot outwardly about a pin 134, such that the fingers 132 pivot outwardly to engage a lug nut and hold it in place. The plunger tip 162 may be a rounded tip which may reduce the risk of the plunger tip binding with surfaces of the fingers 132 under heavy loads.

The fingers 132 may be spring loaded with a rubber band or small torsional spring to cause the fingers to return to a closed position when disengaged, releasing the lug nut. The fingers 132 may be made of a suitable material, and ideally may be made of a material that is softer than the metal of lug nuts so as to prevent damage to the lug nut threads when the ends of the fingers 132 connect with the threads of the lug nut.

The point where the lug nut holder 100 interfaces with the lug nut engagement assembly 130 is referred to as the head. The top of the head may be configured with a width that is narrow enough such that the top of the lug nut engagement assembly 130 will fit inside a lug nut. For example, the width may be narrow to accommodate small lug nuts (such as M12 and 7/16 inch).

The lip portion 164 may of the plunger 160 may connect with the bottom of the base portion 184. The base portion 184 has threaded areas allowing for the fastening mechanism 180 to screw into the threaded area 186. The fastening mechanism secures the barrel 140 with the base portion 184.

FIG. 14A also illustrates the embodiment of the lug nut holder 100 with a base compression spring 184. The base compression spring provides an upward force such that the barrel 140 may be pushed back up after actuation and that the walker has disengaged from the follower.

A pair of set screws 181 act as a guide pins to ensure a relative clocking angle of the internal ring of teeth 156, and double as a method of retention of the barrel 140 via the end of the fastening mechanism 181. The end of the fastening mechanism 181 are screwed into position such that the end tip of the screw 181 is set into the longitudinal barrel recessed portions 141. When screwed into position, the end tip of the screws 181 prevents the barrel 140 from being ejected from the base 150 by the base compression spring 184. The longitudinal barrel recessed portion 141 moves vertically with the end tips of the screws providing a finger to guide the movement of the barrel 140. The screws 181 also prevent the barrel from rotating within the base 150.

Referring to FIGS. 15A-15D, further illustrate operation of the lug nut holder. The position of the wedge formed by the fingers 132 is determined by a position of a cam guide 170. The cam guide 170 has fins 172 that interface with an internal geometry of the barrel body 140. The geometry of the barrel body 140 has two different positions corresponding to the lug nut holder being engaged or disengaged. The positions are at fixed heights, an upper position 146, and a lower position 147. To index the cam guide 170 from one position to the next, a toothed walker is fixed to the base and engages the cam guide 170 when the lug nut holder is compressed. The cam guide 170 is connected to the wedge through a compression spring. The compression spring 144 creates a compliant connection that allows the edge position to vary even through the barrel body 140 positions are at fixed heights. This allows the fingers 132 of the lug nut holder to be opened to different amounts and accommodate different lug nut sizes. Between the head and the wedge there is a return spring which ensures that the wedge properly retracts and that there always is a preload on the assembly. Inside of the head is a bushing to ensure that the wedge stays concentric and does not wear prematurely.

Alternative Methods

In the future, there may be additional sensors added to a lug nut holder or a lug nut nest allowing a computer system to detect the status of each lug nut holder as either engaged disengaged. A set of microswitches or a position sensor could be used to monitor engagement. Sensors to detect whether or not there is a lug nut present for each lug nut holder may also be implemented. Ultrasonic, hall effect, or laser sensors could be used to detect the presence of a lug nut on each lug nut holder.

There are many other ways to store lug nuts in a lug nest but most require active actuation. Individual grippers driven with solenoids or electric motors could be used to grab the inside or outside of the lug nuts. Vacuum could be used to pull the lug nuts off of the socket and hold the lug nuts in place. A pneumatic gripper or a pneumatic balloon that grips the inside of the lug nut are also potential solutions.

The challenge with any active actuation solution is the number of actuators and input/output signals required since a standard passenger vehicle system will require twenty-four individual lug nut holders.

The terminology used herein is for the purpose of describing particular aspects only and is not intended to be limiting of the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the invention. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

What is claimed is:

1. An apparatus comprising:
   a base;
   a barrel, wherein the barrel is coupled with the base in a manner allowing the barrel to move upwardly or downwardly within the base, the barrel having an internal cam portion comprising an internal cam track;
   a lug nut engagement assembly comprising retractable fingers, wherein the lug nut engagement assembly is removeably affixed to the barrel;
   a plunger, the plunger having a rod with a tip for engagement with the retractable fingers, and the plunger having a lip portion disposed about the rod;
   a cam guide, the cam guide having longitudinal rails for engagement with the internal cam track of the barrel, wherein the internal cam track has alternating positions spaced about the internal cam track, and wherein the cam guide is rotatable within the barrel and moveable upwardly and downwardly as the longitudinal rails move through the alternating positions; and
   a first spring disposed between the cam guide and the lip portion.

2. The apparatus of claim 1, the base comprising base mounting holes, and one or more protrusions disposed about an interior surface wall of the base.

3. The apparatus of claim 2, the barrel comprising one or more external longitudinal barrel recessed portions, wherein the one or more external longitudinal barrel recessed portions are configured to engage with the one or more protrusions.

4. The apparatus of claim 1, the cam guide comprising an opening longitudinally disposed internally throughout the cam guide, the opening configured for receiving the plunger.

5. The apparatus of claim 1, wherein the tip is a cone-shaped tip, wherein when the cone-shaped tip engages with the retractable fingers, the retractable fingers are pushed outwardly for engagement with a lug nut.

6. The apparatus of claim 1, further comprising a second spring disposed around a first portion of the plunger and above the lip portion of the plunger.

7. The apparatus of claim 1, the lug nut engagement assembly further comprising a top portion having a hole disposed therein, and a slot disposed in the top portion, a pin positioned within the hole for securing the retractable fingers within the slot and allowing the retractable fingers to move inwardly and outwardly in the slot.

8. The apparatus of claim 1, wherein the alternating positions have a first depth and a second depth.

9. The apparatus of claim 8, the internal cam track further comprising multiple edges disposed in alignment with a vertical plane of the barrel, and multiple edges disposed in an angular alignment with the vertical plane of the barrel.

10. The apparatus of claim 1, wherein the barrel has a threaded portion, and the lug nut engagement assembly has a thread portion, the threaded portion of the barrel and the thread portion of the lug nut engagement assembly being configured for removeably attaching the barrel to the lug nut engagement assembly.

11. The apparatus of claim 1, wherein the plunger is disposed within a portion of the lug nut engagement assembly, within a portion of the barrel and within a portion of the cam guide.

12. The apparatus of claim 1, wherein the lip portion engages with a top portion of the cam guide.

13. The apparatus of claim 1, wherein the base further comprises an internal ring of teeth configured to set the longitudinal rails.

14. The apparatus of claim 1, wherein the alternating positions comprise alternating upper positions and lower positions, and when the longitudinal rails are engaged in the alternating upper positions the retractable fingers are moved to an extended position, and when the longitudinal rails are engaged in the alternating lower positions the retractable fingers are moved to a retracted position.

\* \* \* \* \*